US012215547B2

(12) United States Patent
Smith et al.

(10) Patent No.: US 12,215,547 B2
(45) Date of Patent: Feb. 4, 2025

(54) LADDERS, RUNG ASSEMBLIES FOR LADDERS AND RELATED METHODS

(71) Applicant: LITTLE GIANT LADDER SYSTEMS, LLC, Springville, UT (US)

(72) Inventors: Christian Smith, Highland, UT (US); Benjamin Cook, Provo, UT (US); Sean Peterson, Payson, UT (US); Brian Russell, Saratoga Springs, UT (US); N. Ryan Moss, Mapleton, UT (US); Bryan Wright, Highland, UT (US); Gary Jonas, Springville, UT (US)

(73) Assignee: LITTLE GIANT LADDER SYSTEMS, LLC, Springville, UT (US)

(*) Notice: Subject to any disclaimer, the term of this patent is extended or adjusted under 35 U.S.C. 154(b) by 1445 days.

(21) Appl. No.: 16/693,013

(22) Filed: Nov. 22, 2019

(65) Prior Publication Data

US 2020/0165868 A1 May 28, 2020

Related U.S. Application Data

(63) Continuation of application No. 14/849,917, filed on Sep. 10, 2015, now Pat. No. 10,487,578.
(Continued)

(51) Int. Cl.
*E06C 7/00* (2006.01)
*E06C 1/18* (2006.01)
*E06C 7/08* (2006.01)

(52) U.S. Cl.
CPC ................ *E06C 7/003* (2013.01); *E06C 7/08* (2013.01); *E06C 1/18* (2013.01)

(58) Field of Classification Search
CPC ... E06C 7/003; E06C 7/08; E06C 1/18; E06C 7/006; E06C 7/081; E04F 2011/1046
See application file for complete search history.

(56) References Cited

U.S. PATENT DOCUMENTS 1,147,716 A 7/1915 Goodrum
3,233,702 A 2/1966 Feltrop
(Continued)

FOREIGN PATENT DOCUMENTS

CN 203531733 U 4/2014
DE 102007033765 A1 1/2009
(Continued)

OTHER PUBLICATIONS

Extended European Search Report for EP Application No. 15840026.7, dated May 3, 2018.
(Continued)

*Primary Examiner* — Brian D Mattei
*Assistant Examiner* — Jacob G Sweeney
(74) *Attorney, Agent, or Firm* — Dorsey & Whitney LLP

(57) ABSTRACT

Ladders and ladder components are provided including a rung assembly that provides an alert to a user of the ladder that they are standing on a particular rung or step. In one example, the lower most rung or step of a ladder includes a rung assembly having an alert mechanism. The alert mechanism may provide an audible and/or other sensory alert to a user when they step on the rung assembly so that the user recognizes their position relative to the ground or supporting surface. In one embodiment, the rung assembly is configured such that a front edge remains in a constant or fixed position relative to the rails to which it is coupled so that a user can rely on a fixed or constant position of the front edge of the assembly when climbing or descending the ladder.

16 Claims, 16 Drawing Sheets

Related U.S. Application Data

(60) Provisional application No. 62/049,916, filed on Sep. 12, 2014.

(56) References Cited

U.S. PATENT DOCUMENTS

| | | | |
|---|---|---|---|
| 3,298,012 | A | 1/1967 | Newton |
| 3,696,372 | A | 10/1972 | Garrett |
| 4,403,373 | A | 9/1983 | Kuemmerlin |
| 4,407,045 | A | 10/1983 | Boothe |
| 4,566,150 | A | 1/1986 | Boothe |
| 5,388,665 | A | 2/1995 | Newman |
| 5,954,154 | A | 9/1999 | Ziolkowski |
| 5,971,102 | A | 10/1999 | Brown |
| 6,578,663 | B2 | 6/2003 | Schmitt et al. |
| 6,966,403 | B1 | 11/2005 | Chandra |
| 7,174,994 | B1 | 2/2007 | Coffield et al. |
| 7,364,017 | B2 | 4/2008 | Moss et al. |
| 8,186,481 | B2 | 5/2012 | Moss et al. |
| 8,365,865 | B2 | 2/2013 | Moss et al. |
| 8,701,831 | B2 | 4/2014 | Moss et al. |
| 9,145,733 | B2 | 9/2015 | Worthington et al. |
| 9,711,028 | B1 | 7/2017 | Friedman |
| 10,081,981 | B2 | 9/2018 | Finegan |
| 10,260,282 | B1 | 4/2019 | Bautista et al. |
| 10,487,578 | B2 | 11/2019 | Smith et al. |
| 10,718,161 | B2 | 7/2020 | Bernhardsson et al. |
| 2002/0070078 | A1 | 6/2002 | Barnett |
| 2003/0057019 | A1 | 3/2003 | Schmitt et al. |
| 2005/0173189 | A1 | 8/2005 | Berardi |
| 2006/0032704 | A1 | 2/2006 | Chandra |
| 2009/0084628 | A1 | 4/2009 | Smith |
| 2009/0139798 | A1 | 6/2009 | Bernard |
| 2013/0140111 | A1 * | 6/2013 | Desai ...................... E06C 7/003 182/129 |
| 2014/0231170 | A1 | 8/2014 | Frame et al. |
| 2015/0053504 | A1 | 2/2015 | Ross et al. |
| 2015/0068842 | A1 | 3/2015 | Moss et al. |
| 2015/0090533 | A1 | 4/2015 | Moss et al. |
| 2015/0285476 | A1 | 10/2015 | Bina et al. |
| 2016/0356086 | A1 | 12/2016 | Saccoccio et al. |
| 2018/0094488 | A1 | 4/2018 | Major et al. |
| 2020/0032585 | A1 | 1/2020 | Clark et al. |
| 2022/0290497 | A1 | 9/2022 | Daprizio |

FOREIGN PATENT DOCUMENTS

| | | | |
|---|---|---|---|
| EP | 3191676 | A1 | 7/2017 |
| EP | 3760827 | A1 | 1/2021 |
| KR | 200146389 | Y1 | 6/1999 |
| WO | 2010102033 | A1 | 9/2010 |

OTHER PUBLICATIONS

PCT International Search Report for PCT International Patent Application No. PCT/US2015/049446, mailed Jan. 15, 2016.

U.S. Appl. No. 62/045,979, filed Sep. 4, 2014.

Extended European Search Report for European Patent Application No. 20189923.4 dated Nov. 24, 2020, 8 pages.

* cited by examiner

LADDERS, RUNG ASSEMBLIES FOR LADDERS AND RELATED METHODS

CROSS-REFERENCE TO RELATED APPLICATIONS

The present application is a continuation of U.S. application Ser. No. 14/849,917, filed Sep. 10, 2015, now issued as U.S. Pat. No. 10,487,578, which claims priority to provisional application Ser. No. 62/049,916, filed Sep. 12, 2014, the disclosures of which are incorporated by reference herein in their entireties.

BACKGROUND

Ladders are conventionally utilized to provide a user thereof with improved access to elevated locations that might otherwise be inaccessible. Ladders come in many shapes and sizes, such as straight ladders, straight extension ladders, stepladders, and combination step and extension ladders. So-called combination ladders may incorporate, in a single ladder, many of the benefits of various ladder designs.

Ladders known as step ladders, sometimes referred to as A-frame ladders, are self-supporting ladders, meaning that they do not need to be leaned against a wall, pole or other structure for stability. Rather, step ladders may be positioned on a floor (or other similar surface) such that at least three feet of the ladder, and conventionally four feet, provide a stable support structure for a user to climb upon, even in an open space (e.g., outside or in the middle of a room) without a wall, roof, pole or other type of structure being necessary for the stability of the ladder. Conventional step ladders may include a first rail assembly coupled with a top cap and a second rail assembly coupled with the top cap. One of the rail assemblies conventionally includes a plurality of rungs that are evenly spaced between the supporting surface (e.g., the floor or ground) and the top cap.

Regardless of the type of ladder being employed, using a ladder can present various risks to the user. For example, one potential hazard exists where a user is distracted or is not paying attention and loses track of which rung they are currently standing on particularly when they are descending the ladder. In such a case, a user may think, for example, that their next "step" downward will place them on the ground at the bottom of the ladder when, in reality, there is still one more step for them to descend prior to reaching the ground. This misperception can result in the user stumbling on, or even missing completely, the lowest rung of the ladder. There is a continuing desire in the industry to provide ladders that reduce the risk of accident and provide improved safety and stability to a user thereof.

SUMMARY

The present invention is directed to ladders and ladder components, including embodiments of ladders having an alert mechanism configured to provide a user of the ladder with an indication of their position on the ladder. In accordance with one embodiment, a ladder is provided having a first assembly that includes a first pair of spaced apart rails and a rung assembly coupled between the first pair of rails. The rung assembly includes a base member, a displaceable member coupled with the base member and configured to be displaced from a first position to a second position relative to the base member and at least one alert mechanism associated with the displaceable member and configured to provide an audible alert when the displaceable member is displaced from the first position to the second position, wherein a front edge of the at least one rung assembly extending between the first pair of rails maintains a substantially constant position relative to the first rails when the displaceable member is displaced from the first position to the second position.

In one embodiment, the ladder may comprise a plurality of additional rungs extending between and coupled to the first pair of spaced apart rails.

In one embodiment, the rung assembly is positioned to act as the lowermost rung of the step ladder.

In one embodiment the base member includes: a front wall; a rear wall; an upper wall extending between the front wall and rear wall; and a groove extending at least partially between the first pair of rails and positioned adjacent the front wall and the upper wall. In one particular embodiment, the displaceable member includes an upper tread portion and a pivoting member disposed in the groove of the base member.

In another embodiment, the base member includes: a front wall; a rear wall; an upper wall extending between the front wall and rear wall; and a channel formed in the upper wall extending between the first pair of rails. In one particular embodiment, the displaceable member is at least partially disposed within the channel.

In one embodiment, when the displaceable member is in the second position, an upper tread portion of the displaceable member is substantially coplanar with the upper wall of the base member.

In one embodiment, the displaceable member includes an upper tread portion and a pair of side arms, each side arm being pivotally coupled with the base member.

In one embodiment, each side arm extends through one of a pair of openings formed in the base member. The side arms may include a lower portion disposed beneath the upper wall of the base member and the at least one alert mechanism may include a striker disposed on the lower portion of each side arm configured to contact the upper wall when the displaceable member is in the second position.

In one embodiment, the at least one alert mechanism includes a pin, a collar slidably disposed about the pin, and a detent mechanism configured to hold the collar at a specified position on the pin until a force of a specified magnitude is applied to the collar.

The at least one alert mechanism may be positioned and configured so that the detent mechanism releases the collar when the displaceable mechanism is in the first position.

In one embodiment, the at least one alert mechanism includes two alert mechanisms.

In one embodiment, the ladder further comprises a second assembly having at least one rail and a top cap coupled to the first assembly and to the second assembly;

In accordance with another embodiment of the invention, a rung assembly for a ladder is provided. The rung assembly comprises a base member, a displaceable member coupled with the base member and configured to be displaced from a first position to a second position relative to the base member, and at least one alert mechanism associated with the displaceable member and configured to provide an audible alert when the displaceable member is displaced from the first position to the second position, wherein a front edge of the at least one rung assembly extending between the first pair of rails maintains a substantially constant position relative to the first rails when the displaceable member is displaced from the first position to the second position.

In one embodiment, the base member includes: a front wall; a rear wall; an upper wall extending between the front wall and rear wall; and a groove extending at least partially between the first pair of rails and positioned adjacent the front wall and the upper wall.

In one embodiment the base member includes: a front wall; a rear wall; an upper wall extending between the front wall and rear wall; and a channel formed in the upper wall extending between the first pair of rails.

In one embodiment, the displaceable member includes an upper tread portion and a pair of side arms, the side arms each extending through a separate opening formed in the base and being pivotally coupled with the base member, wherein the at least one alert mechanism further includes a striker associated with the lower portion of each side arm, each striker being configured to contact the upper wall when the displaceable member is in the second position.

Features and elements of one described embodiment may be combined with other embodiments without limitation.

BRIEF DESCRIPTION OF THE DRAWINGS

The foregoing and other advantages of the invention will become apparent upon reading the following detailed description and upon reference to the drawings in which.

DETAILED DESCRIPTION

Various embodiments of ladders, ladder components, assemblies and mechanisms are described herein. The described embodiments are not mutually exclusive of each other. Rather, various features of one described embodiment may be used in conjunction with features of other describe embodiments without limitation.

Figure 1:
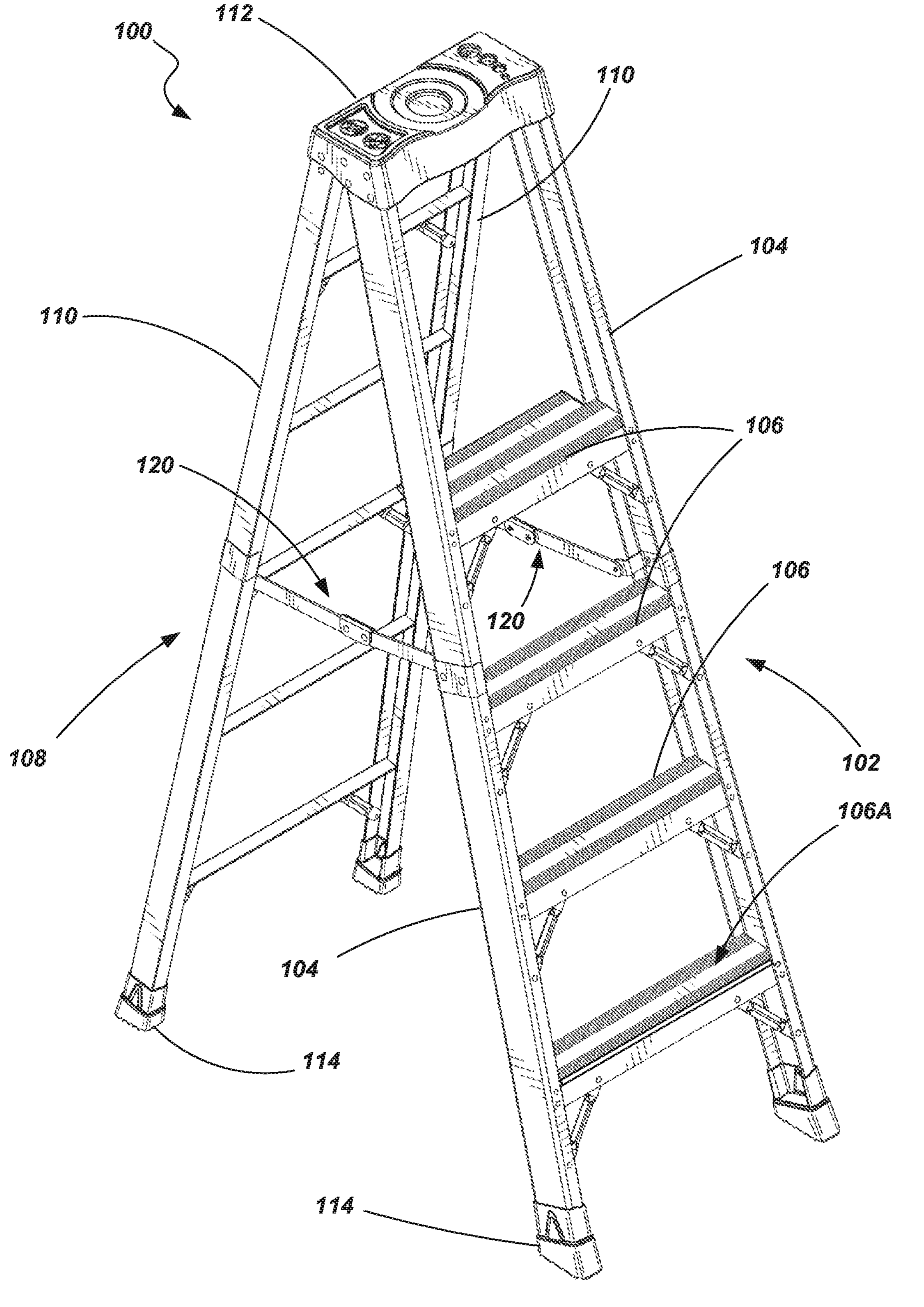
FIG. 1 is a perspective view of a step ladder according to an embodiment of the present invention.

Referring initially to FIG. 1 a stepladder 100 is shown in accordance with an embodiment of the present invention. The stepladder 100 includes a first assembly 102 having a pair of spaced apart rails 104 and a plurality of rungs 106 extending between, and coupled to, the rails 104. The spaced apart rungs 106 are substantially parallel to one another and are configured to be substantially level when the stepladder 100 is in an orientation for intended use, so that they may be used as "steps" for a user to ascend the stepladder 100 as will be appreciated by those of ordinary skill in the art. In the specific embodiment shown in FIG. 1, the lowermost rung comprises a rung assembly 106A as will be described in further detail below. In other embodiments, other rungs (e.g., second lowest rung, top rung, or all rungs) may alternatively, or additionally, comprise a rung assembly if desired.

The stepladder 100 also includes a second assembly 108 having a pair of spaced apart rails 110. The second assembly 108 need not include a plurality of rungs between the spaced apart rails 110. Rather, bracing or other structural components may be used to provide a desired level of rigidity and strength to the spaced apart rails 110. However, in some embodiments, the second assembly 108 may include rungs configured generally similar to those associated with the first assembly 102. The second assembly 108, thus, may be used to help support the stepladder 100 when in an intended operational state, such as generally depicted in FIG. 1.

The first and second assemblies 102 and 108 may be formed of a variety of materials and using a variety of manufacturing techniques. For example, in one embodiment, the rails 104 and 110 may be formed of a composite material, such as fiberglass, while the rungs and other structural components may be formed of aluminum or an aluminum alloy. In other embodiments, the assemblies 102 and 108 (and their various components) may be formed of other materials including other composites, plastics, polymers, metals, metal alloys or combinations of such materials.

A top cap 112 is coupled to a portion of the first assembly 102 and a portion of the second assembly. For example, the top cap 112 may be pivotally coupled to an upper end of the each rail 104 of the first assembly 102 along a common axis. In the embodiment shown in FIG. 1, the top cap 112 is also pivotally coupled to an upper end of each rail 110 of the second assembly 108 along another common axis. It is noted that the use of the term "upper end" merely refers to a relative position of the described components when the stepladder 100 is in an orientation of intended use orientation.

In one embodiment, the top cap 112 may simply be a structural component configured to facilitate relative coupling of the first and second assemblies 102 and 108. In other embodiments, the top cap may include features that enable it to be used as a tray or a tool holder. Thus, the top cap 112 may be used to organize a user's tools, supplies and other resources while working on the stepladder 100. For example, such a top cap is described in U.S. Pat. No. 8,186,481 issued May 29, 2012 and entitled LADDERS, LADDER COMPONENTS AND RELATED METHODS, the disclosure of which is incorporated by reference herein in its entirety. It is noted that, for safety purposes, the top cap 112 is not conventionally configured as a "rung" or a "step" and may not necessarily be designed to support a user's full weight. As with other components of the stepladder 100, the top cap 112 may be formed from a variety of materials. In one embodiment, the top cap 112 may be formed from a plastic material that is molded into a desired size and shape.

The stepladder 100 may additionally include a plurality of feet 114 (one associated with each rail) configured to engage a supporting surface such as the ground. The feet 114 may be configured in a variety of manners based on, for example, the type of environment in which the ladder is anticipated to be used. For example, the feet may be formed of a plastic or polymer material and can be configured with a plurality of ridges, knobs or other features configured to provided increased friction between the ladder and a relatively rigid supporting surface (e.g., concrete, tile or wood). On the other hand, the feet 114 may be configured with barbs or other sharp protrusions configured to dig into a relatively softer supporting surface (e.g., dirt or grass).

A pair of hinged braces, referred to herein as spreaders 120, are used to maintain a desired angle between the first and second assemblies 102 and 108 when the stepladder 100 is in a deployed or useable state. The hinged nature of such spreaders 120 helps to enable the first and second assemblies 102 and 108 to collapse into a stored state and then help lock the assemblies 102 and 108 in position relative to one another when in a deployed or useable state. It is noted that the spreaders 120 are not configured as rungs or platforms, or otherwise configured to support a user standing thereon. Rather, the spreaders 120 are simply configured to structurally maintain the ladder 100 in a deployed position while enabling the rail assemblies to be selectively collapsed relative to each other for storage and transportation of the ladder 100.

An example of a ladder having both rail assemblies directly pivotally coupled with the top cap 112 is set forth in U.S. Pat. No. 8,701,831 (application Ser. No. 12/716,126 entitled STEPLADDERS AND RELATED METHODS filed Mar. 2, 2010), the disclosure of which is incorporated by reference herein in its entirety. It is noted, as described with respect to other embodiments below, that both rail assemblies need not be pivotally coupled with the top cap. Additionally, in some embodiments, the second assembly 108 may include only a single rail if desired. Other examples of stepladders and top caps are described in U.S. patent application Ser. No. 14/496,987 entitled STEP LADDERS, COMPONENTS FOR STEP LADDERS AND RELATED METHODS, filed Sep. 25, 2014, claiming priority to U.S. Provisional Application 62/045,979, filed Sep. 4, 2014, entitled STEP LADDERS, the disclosures of which are incorporated by reference herein in their entireties.

Referring now to FIGS. 2-5, a rung assembly 106A is shown in accordance with an embodiment of the invention. The rung assembly 106A includes a base member 140 that is configured for substantially rigid coupling with the rails 104 of the first assembly 102 of a ladder 100. In the embodiment shown, the base member 140 includes a front wall 142, a rear wall 144, and an upper wall 146 extending between and coupled with the front and rear walls 142 and 144. In the embodiment shown, the various walls 142, 144 and 146 are formed as an integral unit (e.g., welding, brazing, adhesive, mechanical fasteners, etc.). The upper wall 146 may or may not include traction features (e.g., ridges and grooves) such as are often found in conventional ladder rungs.

A groove 148 is formed at, and extends along, the front edge of the upper wall 146. The groove 148 may be positioned directly between the upper wall 146 and the front wall 142. In other embodiments, the groove 148 may be formed wholly in the upper wall 146 or wholly in the front wall 142. In other embodiments, rather than a single continuous groove 148 that extends substantially the entire width (i.e., extending between the rails 104 when attached to a ladder) of the base member 140, one or more grooves of shorter dimension may extend partially along the width of the base member 140. In yet other embodiments, it is noted that the groove 148 could be located along the rear edge of the upper wall 146, reversing the pivoting action of the displaceable member 150 which is described further below.

As just noted, the assembly 106A further includes a displaceable member 150 that is coupled with the base member 140. In the embodiment shown in FIGS. 2-5, the displaceable member includes an upper wall or tread portion 152, which may include one or more traction features 154 (e.g., ridges and grooves). The displaceable member 150 may include a rear wall 156 that is configured to extend to, or beyond, the juncture of the rear wall 144 and upper wall 146 of the base member 140. During actuation of the assembly 106A, the rear wall 156 of the displaceable member may help to prevent the inadvertent pinching of a user's body, the catching of clothing or the entrance of foreign objects between the displaceable member 150 and the base 140.

Figure 4:
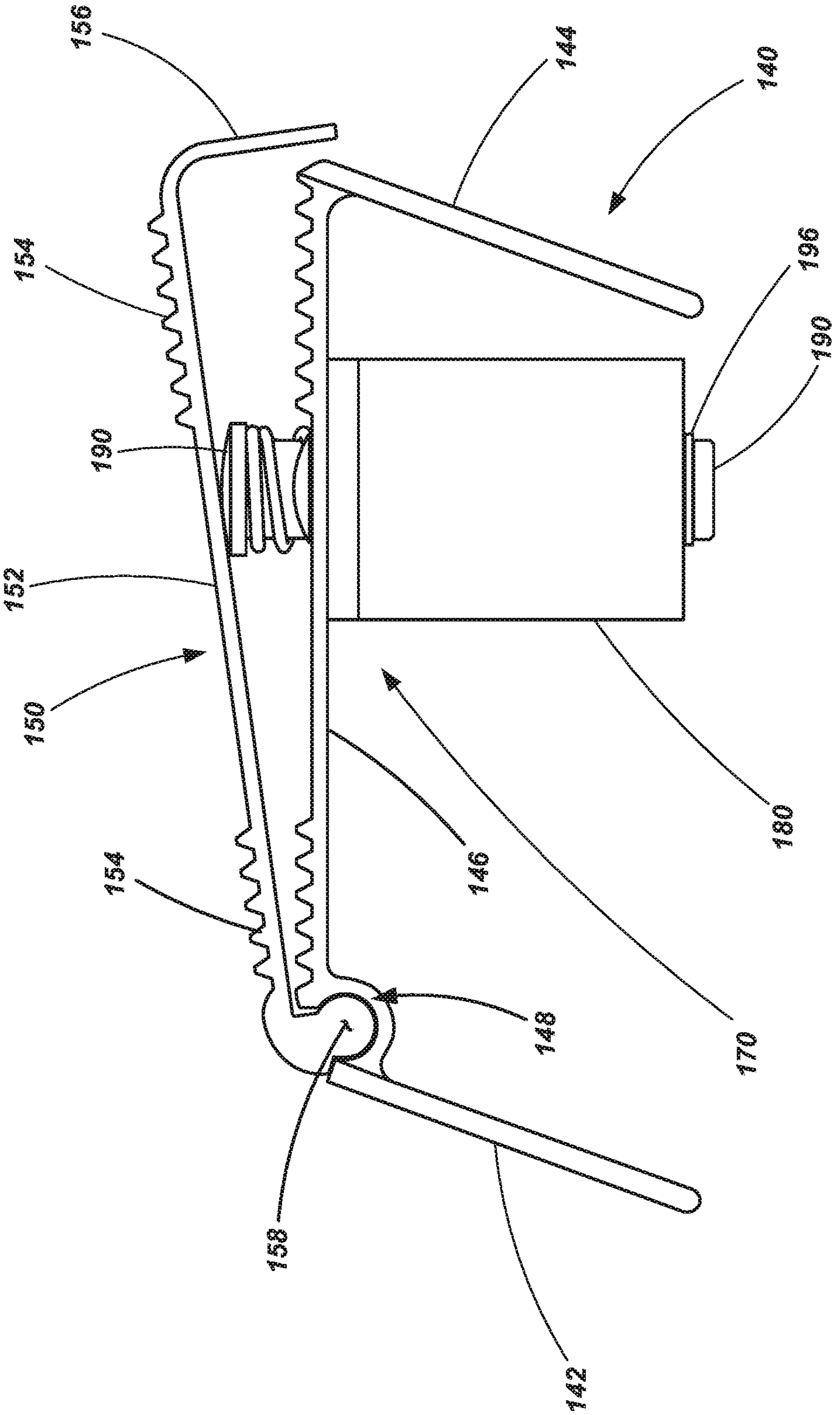
FIG. 4 is a side view of the rung assembly of FIG. 2 while in a first state.
Figure 5:
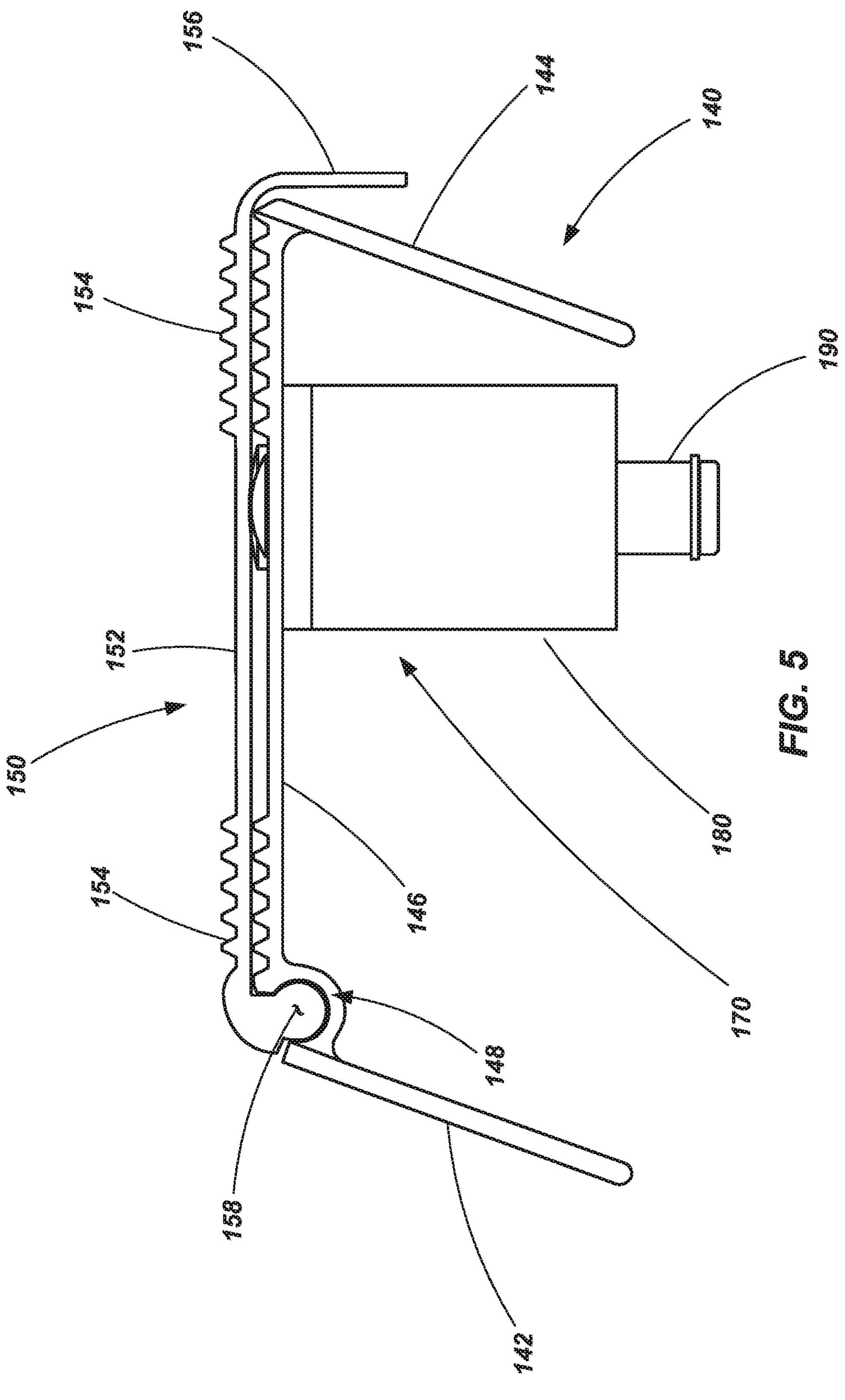
FIG. 5 is a side view of the rung assembly if FIG. 2 while in a second state.

The displaceable member 150 may also include a pivot member 158 (or multiple pivot members) disposed within the groove 148 of the base member 140. The pivot member 158 may include, for example, an elongated member having a portion thereof that is substantially cylindrical, the pivot member 158 being configured to substantially conform in size and shape with the groove 148. As seen by comparing FIGS. 4 and 5, the pivot member 158 enables pivoting of the displaceable member 150 relative to the fixed base 140 about an axis extending generally along the front edge of the rung assembly 106A (e.g., along or adjacent an edge where the front wall 142 meets the upper wall 146 of the base 140) and extending between the rails 104 of the ladder 100. The "unactuated" or "normal" state of the rung assembly is shown in FIG. 4, with the displaceable member 150 positioned so that its tread portion or upper wall 152 is at an acute angle relative to the upper wall 146 of the base member 140. As shown in FIG. 5, when actuated (e.g., when a user is standing on the rung assembly), the upper wall 154 of the displaceable member is pivoted such that it is positioned against and substantially parallel with the upper wall 146 of the base member 140.

The rung assembly 106A further includes one or more alert mechanisms 170 that, when actuated by displacement of the displaceable member 150 a desired distance (e.g., from the position in FIG. 4 to the position in FIG. 5), provides an alert to the user (e.g., by audible noise) informing them that they have stepped on the rung assembly 106A. Thus, for example, when the rung assembly 106A is placed as the lowermost rung of a ladder (e.g., as shown in FIG. 1), the alert mechanism 170 provides a user with information, as they descend, that they have reached the lowermost rung and that their next step downward will be to the ground or other surface supporting the ladder 100.

Referring to FIGS. 6-9, the alert mechanism 170 is shown in accordance with an embodiment of the present invention. The alert mechanism 170 includes a housing member or a bracket 180 having flange portions of 181 for coupling with the upper wall 146 of the base member 140. The bracket 180 includes two walls 182 and 184, each having an opening 186 and 188 formed therein. A pin member 190 extends through the openings 186 and 188. The pin member 190 includes a shoulder 192 formed along an upper portion thereof and sized to be wider than the opening 186 formed in the upper wall 182. The shoulder 192 abuts a biasing member 194 (e.g., a coiled spring or other member) positioned about the pin member 190 between the upper wall 184 and the shoulder 192. The shoulder 192 cooperates with the biasing member 194 to retain the pin member 186 within the bracket 180 and also biases the pin 190 upwards relative to the bracket 180.

A retainer 196 may be coupled to a lower end of the pin member 190 (e.g., a c-clip or snap ring disposed in a groove 198 formed in the pin member) and be configured to abut the lower wall 184 (when displaced towards the lower wall) and retain the pin member 190 within the bracket 180. A sleeve or collar 200 is slidably positioned about the pin member 190 between the upper and lower walls 182 and 184. A biasing member 202 is positioned about the pin member 190 and located between the collar 200 and the lower wall 184 of the bracket 180 and biases the collar upwards toward the upper wall 182. A detent mechanism 204 (FIGS. 7-9) or other retaining mechanism is associated with the pin member 190 and collar 200 to retain the collar 200 at a desired location on the pin member 190 until a force of a specified magnitude is applied against the collar 200, causing the collar 200 to slide along the pin member 190 as will be described in further detail below. The detent mechanism 204 may include, for example, a biasing member 206 (e.g., a coiled spring) disposed in a through hole 208 formed in the pin member 190. A pair of ball members 210 may be positioned on each side of the biasing member 206 so as to partially protrude from the through hole 208. A groove 212, which may correspond generally in size to conform with the radius of the ball members 210, may be formed on the internal surface of the collar 200 such that when the groove 212 is aligned with the ball members 210, the ball members are displaced so as to be partially in the groove 212 and partially in the through hole 208, holding the collar 200 in place relative to the pin member 190. The collar 200 remains in the held position relative to the pin member 190 until a force is applied to the collar 200 that is sufficient to overcome the force applied by the biasing member 206 of the detent mechanism 204 (and any friction forces between the ball members 208 and groove of the collar 200), causing the ball members 210 to retract within the through hole 208 and enabling the collar 200 to slide along the length of the pin member 190.

Figure 2:
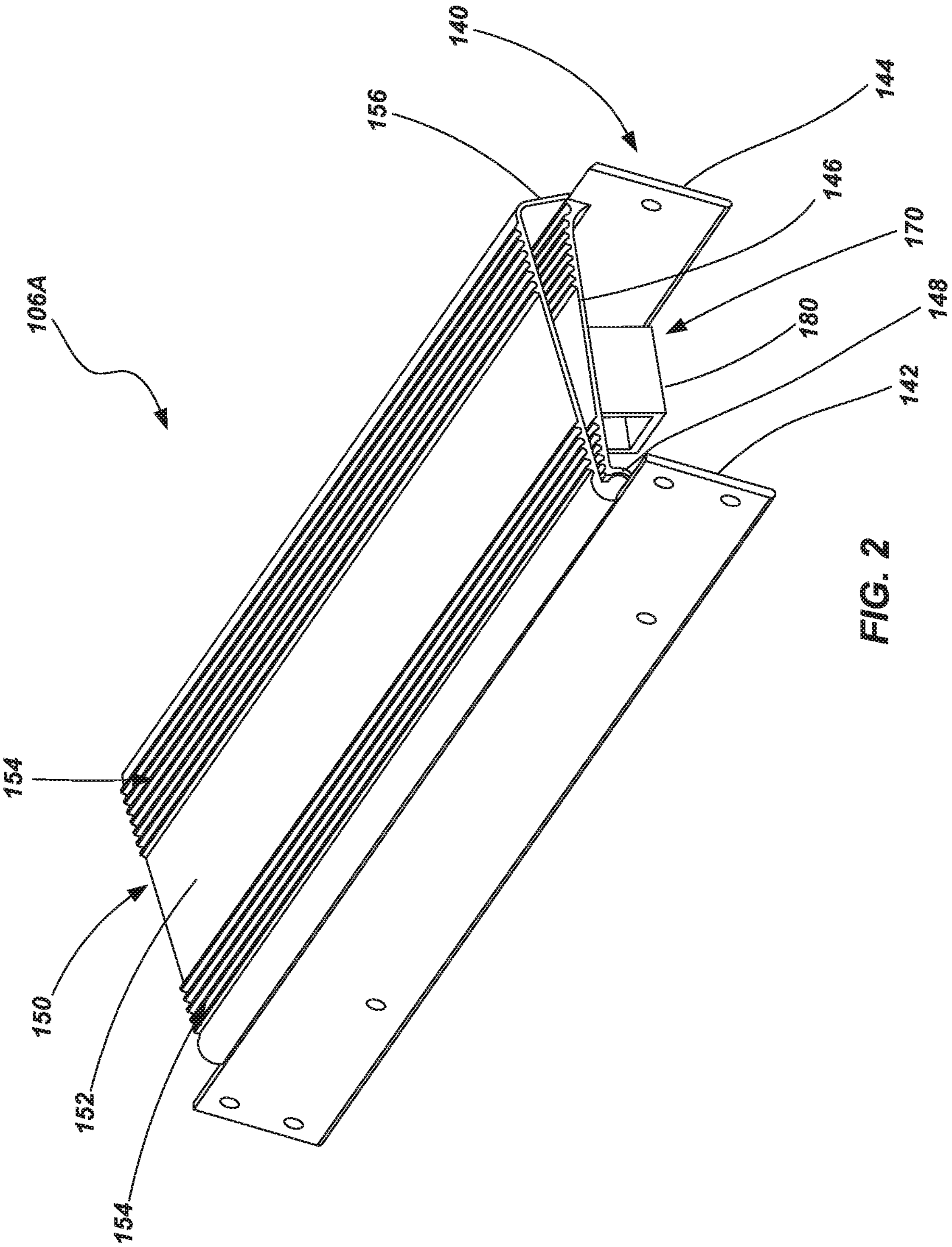
FIG. 2 is a perspective view of a rung assembly according to an embodiment of the present invention.
Figure 3:
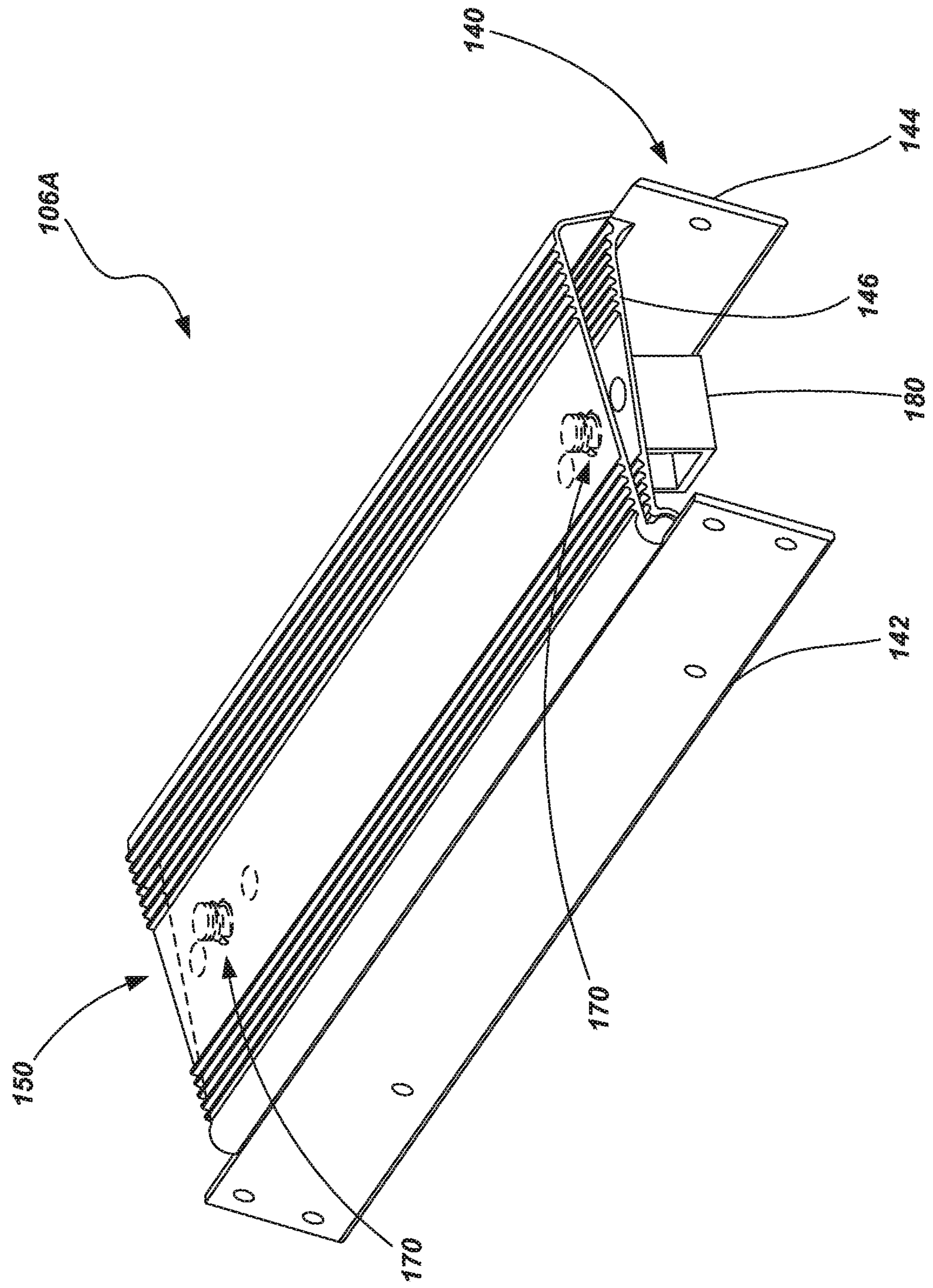
FIG. 3 is a perspective view of the rung assembly of FIG. 2, showing a hidden portion of the rung assembly.
Figure 6:
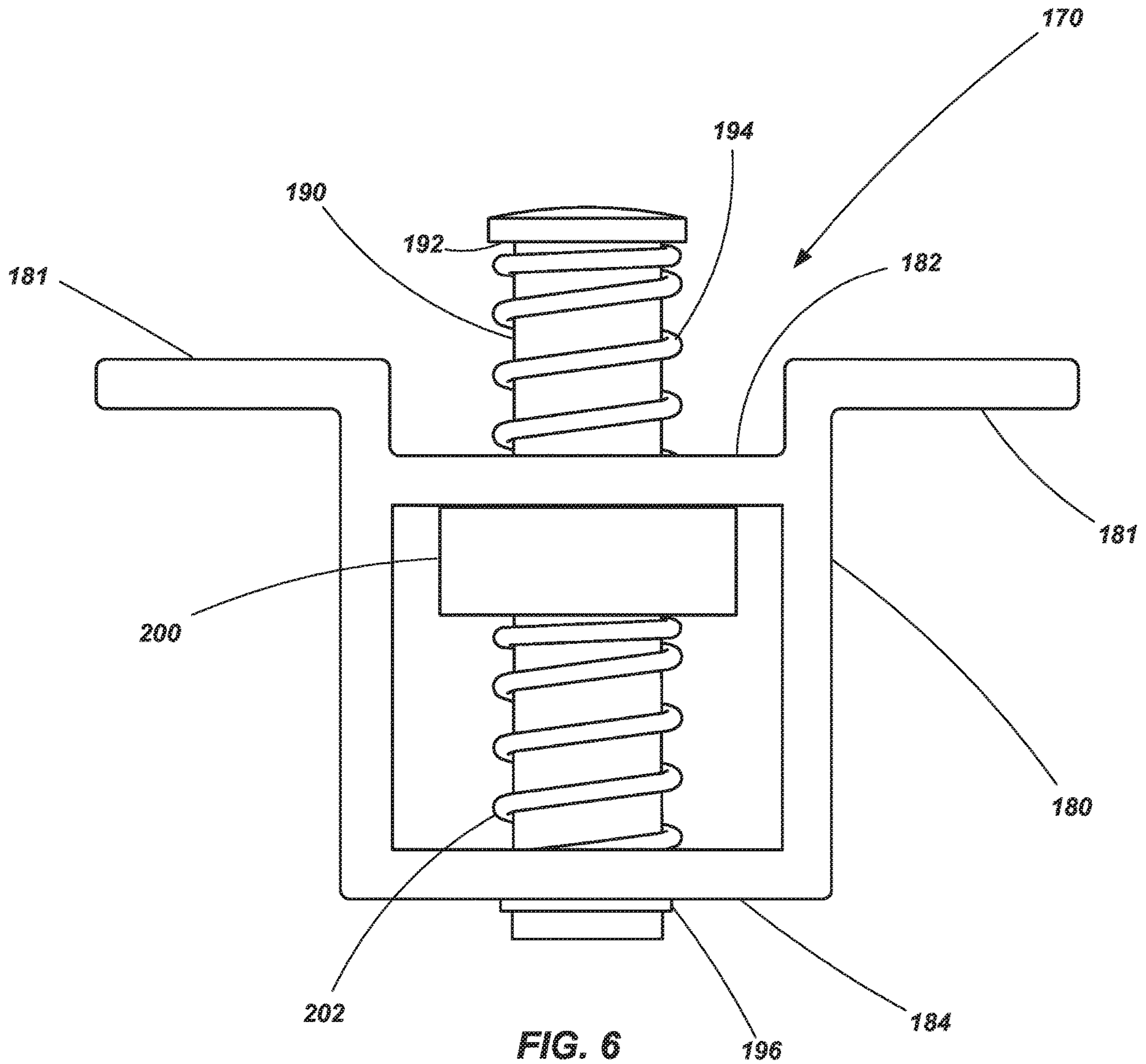
FIG. 6 is a side view of an audible alert mechanism in a first state as may be used in a rung assembly according to an embodiment of the present invention.
Figure 7:
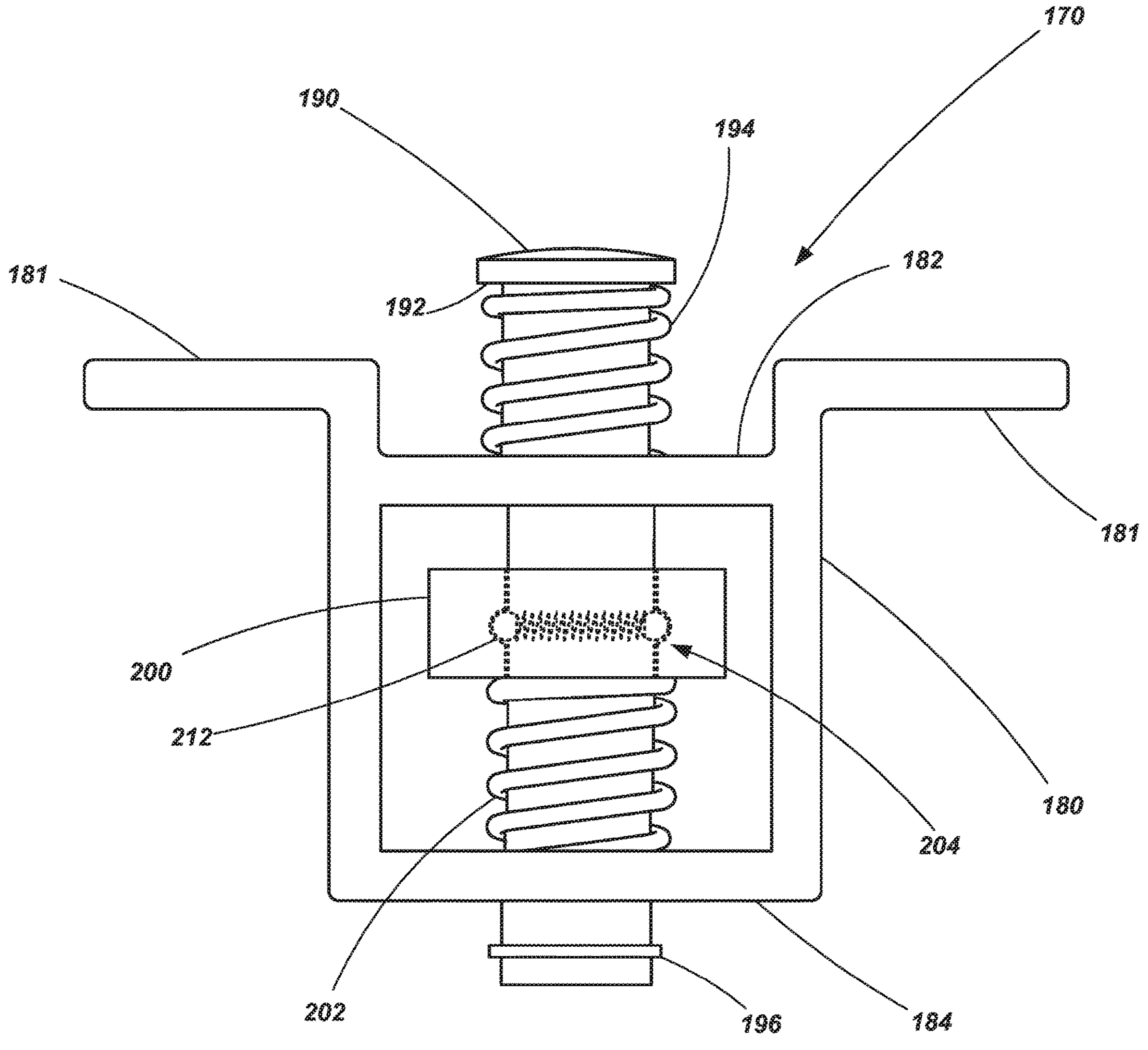
FIG. 7 is a side view of the mechanism shown in FIG. 6 while in a second state.
Figure 8:
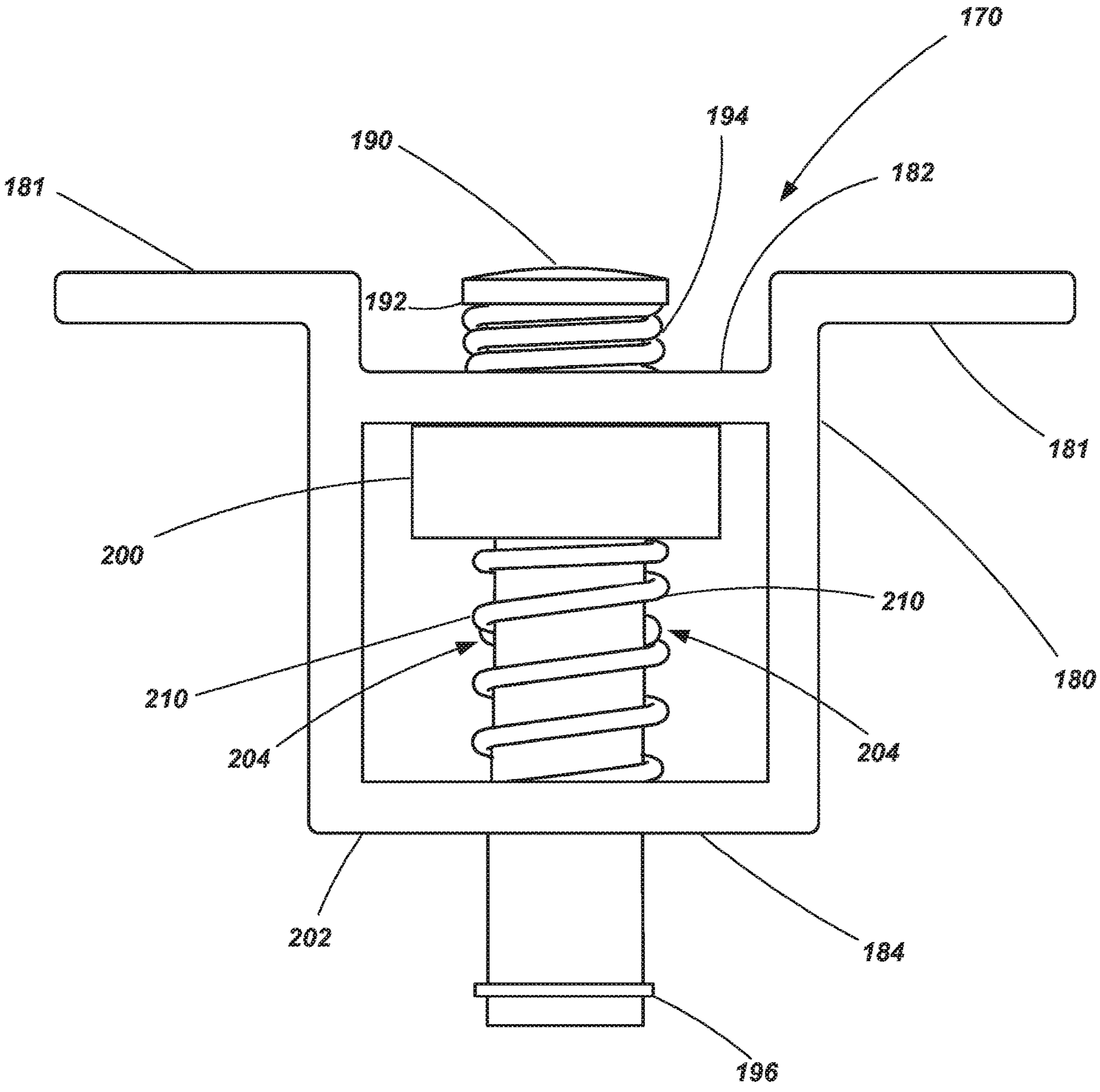
FIG. 8 is a side view of the mechanism shown in FIG. 6 while in a third state.
Figure 9:
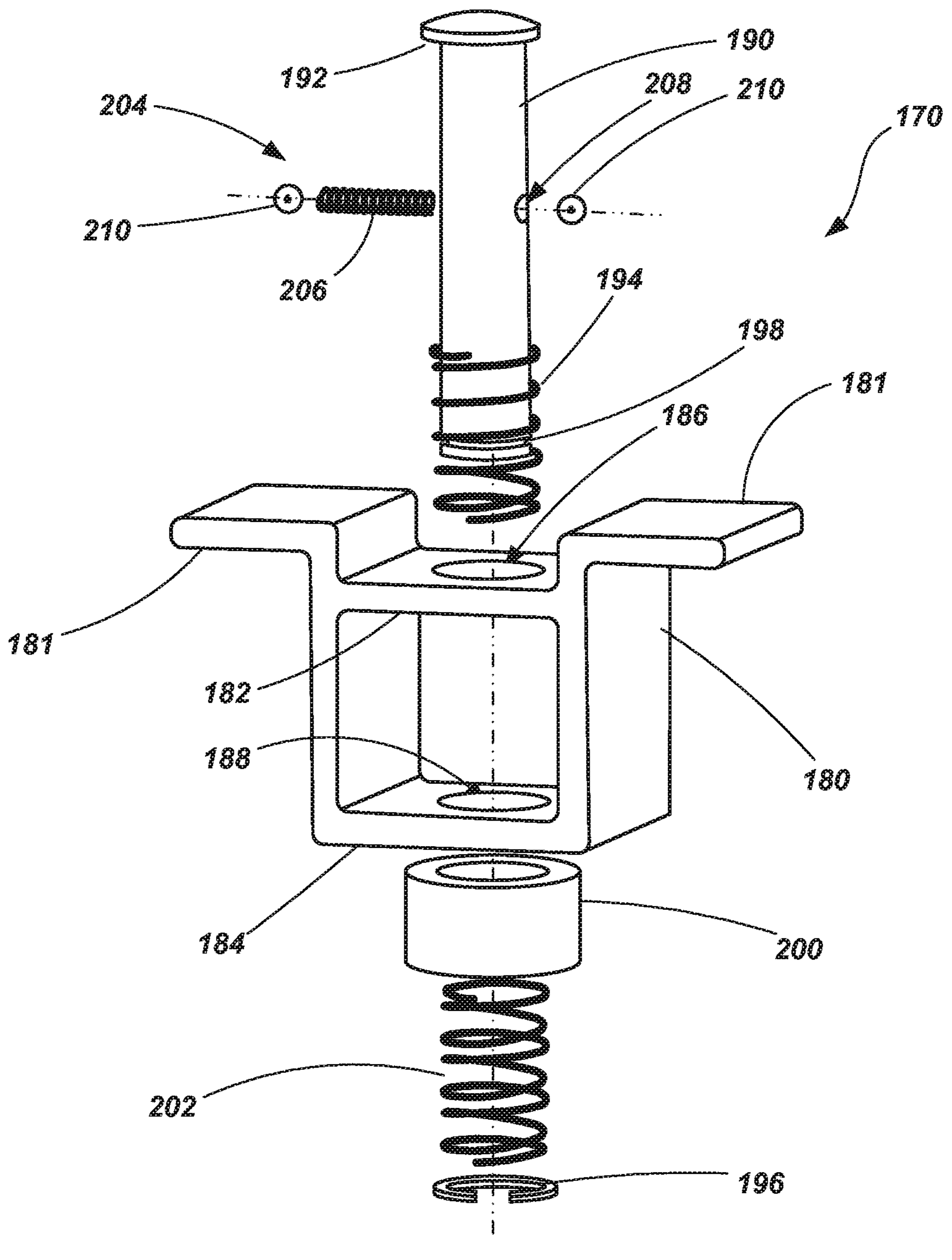
FIG. 9 is an exploded view of the mechanism shown in FIG. 6.
Figure 10:
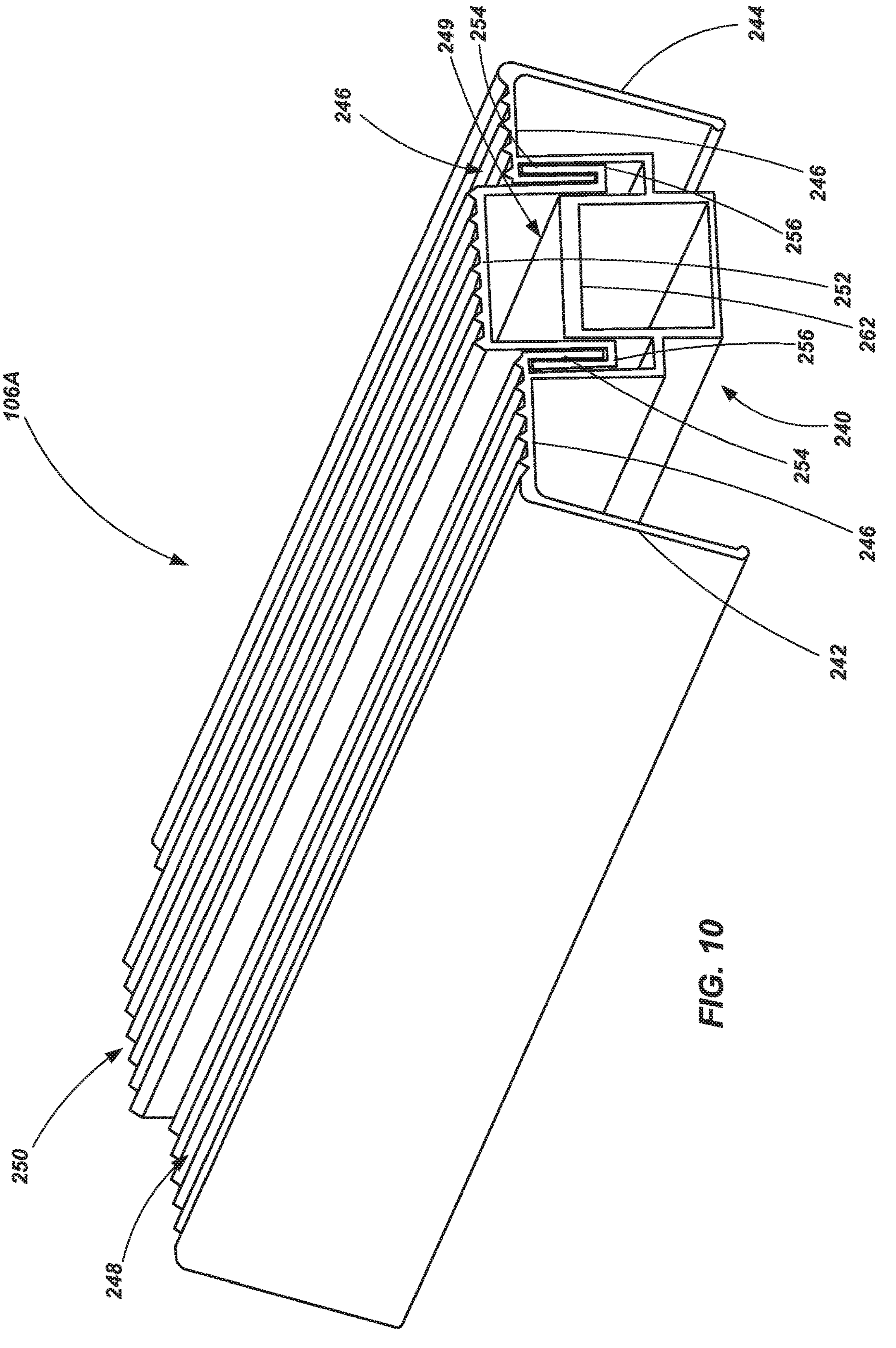
FIG. 10 is a top perspective view of a rung assembly according to another embodiment of the present invention.
Figure 11:
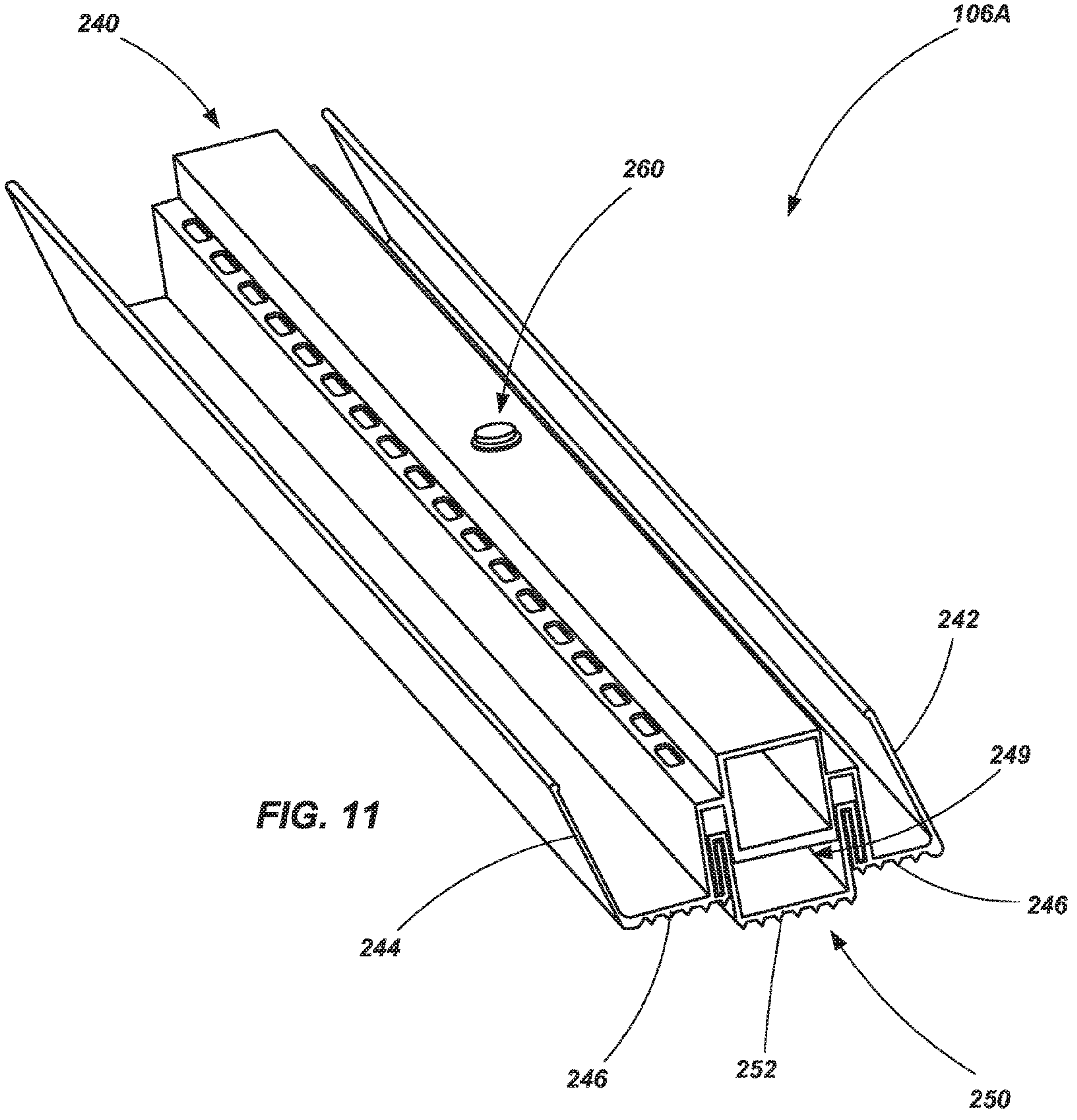
FIG. 11 is a bottom perspective view of the rung assembly shown in FIG. 10.
Figure 12:
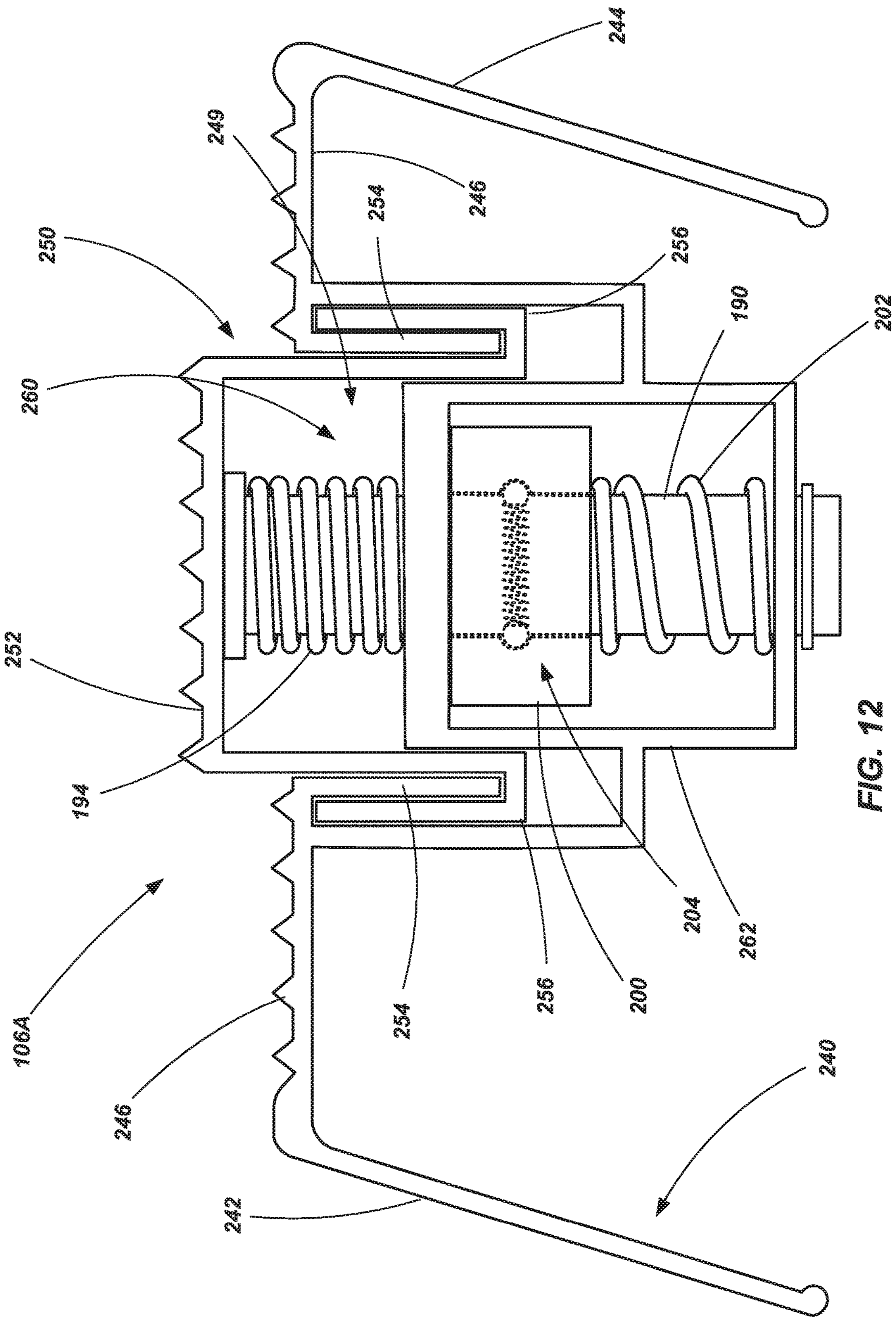
FIG. 12 is a side view of the rung assembly shown in FIG. 10.
Figure 13:
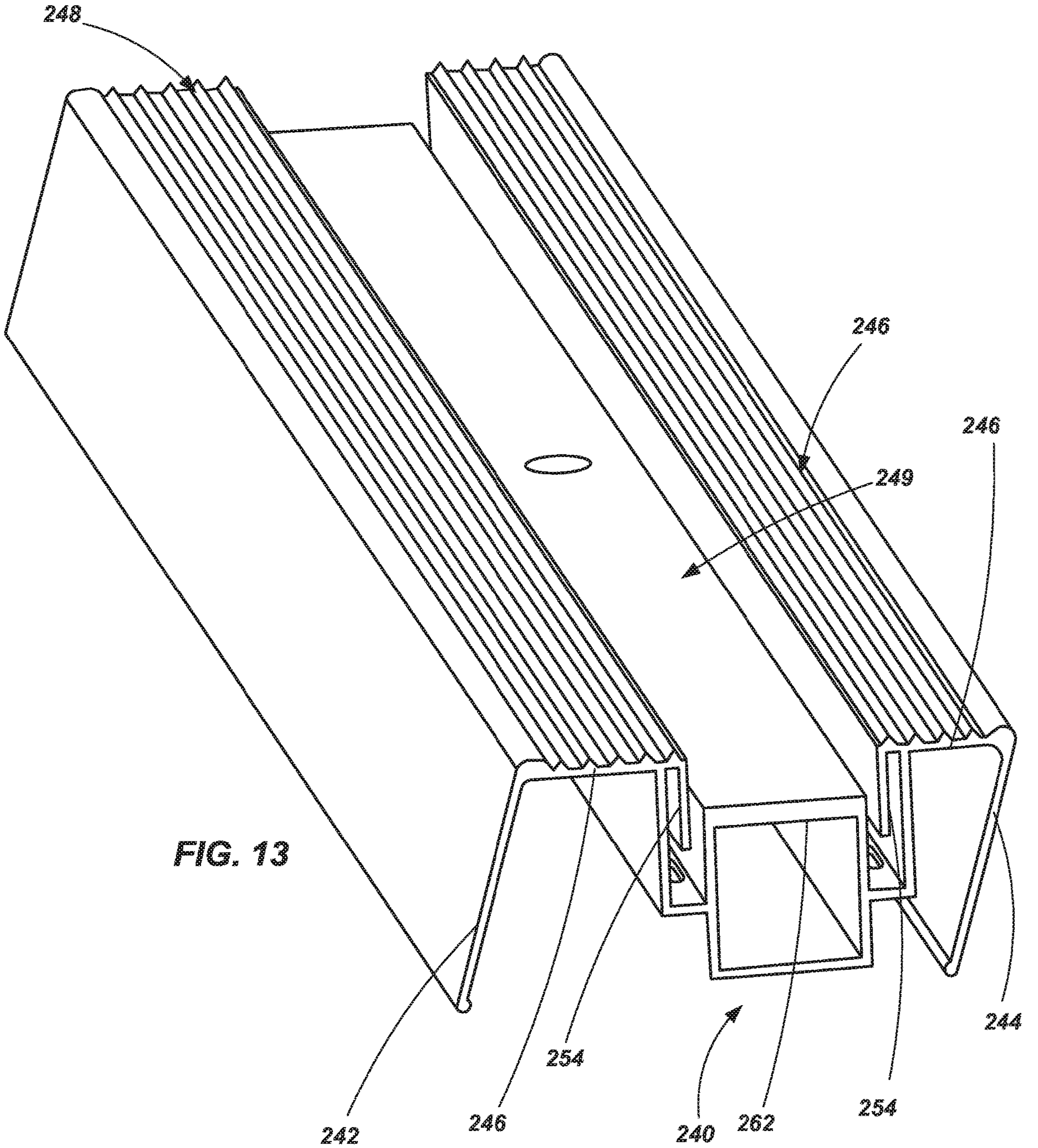
FIG. 13 is a top perspective view of a base member of the rung assembly shown in FIG. 10.

Thus, in operation, when no force is applied to the alert mechanism (beyond the weight of the displaceable member 150), the alert mechanism 170 is in the state as shown in FIG. 6 and the rung assembly 106A is in the state as shown in FIGS. 2-4. However, when a user steps on the rung assembly 106A, their weight causes the pin member 190 to be placed downwards (via the pressure applied to the displaceable member 150) as indicated in FIG. 7. This causes the upper biasing member 194 to be compressed between the shoulder 192 and the upper wall 182. Additionally, the detent mechanism 204 holds the collar 200 in position relative to the pin 190 such that the collar 200 is displaced along with the pin member 190 and compresses the lower biasing member 202. As the lower biasing member 202 becomes compressed, the force that it exerts against the collar 200 increases until, when a force of sufficient magnitude is reached, the force of the biasing member 202 overcomes the holding capacity of the detent mechanism 204, causing the collar 200 to be displaced upwards relative to the pin member 190 until it abuts the upper wall 182 as seen in FIG. 8. This is the "actuated" state of the alert mechanism 170 and the rung assembly 106A (as shown in FIG. 5). When the collar 200 is released (i.e., the detent mechanism 204 releases its hold on the collar 200), the lower biasing member 202 causes the collar 200 to slap or smack against the upper wall 182 creating a substantial audible event, alerting the user to the fact that they are standing on the rung assembly 106A. In certain embodiments, the slap or smack of the collar 200 against the upper wall 182 may be of sufficient force to also be felt by a user in addition to being heard.

When a user steps off of the rung assembly 106A, the upper biasing member causes the pin member 190 to be displaced upward, causing the displaceable member 150 to be displaced upward (see FIGS. 2, 4 and 6), resetting the detent mechanism 204 within the groove of the collar 200, again holding the collar 200 on the pin member 190 as shown in FIG. 6. It is noted that two alert mechanisms 170 are shown in FIG. 3 in association with the described embodiment. However, in other embodiments, a single alert mechanism 170 may be used or more than two alert mechanisms may be used.

Referring now to FIGS. 10-13, a rung assembly 106A is shown in accordance with another embodiment of the invention. The rung assembly 106A includes a base member 240 that is configured for substantially rigid coupling with the rails 104 of the first assembly 102. In the embodiment shown, the base member 240 includes a front wall 242, a rear wall 244, and an upper wall 246 extending between and coupled with the front and rear walls 242 and 244. The upper wall my include traction features 248 (e.g., ridges and grooves) such as are conventional in traditional ladder rungs. Additionally, the upper wall 246 defines a channel 249 extending across its width.

A displaceable member 250 is disposed within the channel 249 and configured to be displaced between at least two positions. The displaceable member 250 includes an upper wall or surface 252 that may include traction features if desired. The base member 240 and the displaceable member 250 may include interlocking flange members, 254 and 256, respectively. The interlocking flange members 254 and 256 retain the displaceable member 250 within the channel 249 and define a substantially vertical displacement path for the displacement member 250 relative to the base member 240.

The rung assembly 106A shown in FIGS. 10-13 may also include one or more alert mechanisms 260 structured similarly to that which has been described above. For example, a structural portion 262 of the base member 240 may function similar to the housing or bracket 170 described above (e.g., as an integrated bracket or housing). Additionally, the alert mechanism 260 may include a pin member 190 extending through openings of the structural portion 262, biasing members 194 and 202, collar 200 and a detent mechanism (not shown in FIGS. 10-13). The pin member 190 is in abutting contact with the upper wall 252 of the displaceable member 250 so as to be actuated upon displacement of the displaceable member 250.

The alert mechanism 260 functions substantially similar to that described above with respect to the embodiment shown in FIGS. 6-9. when a user steps on the rung assembly 106A, the displaceable member 250 is displaced downwards into the channel 249 until its upper surface is substantially flush or coplanar with the upper surface 246 of the base member 240. Displacement of the displaceable member 250 causes the pin member 190 to also be displaced downward. The collar 200 is displaced with the pin member 190 until forces of the associated detent mechanism 204 are overcome, causing the collar 200 to be displaced upwards and slap against a surface of the structural portion 262 of the base member 240, alerting a user to the fact that they just stepped on the rung assembly 106A.

Figure 14:
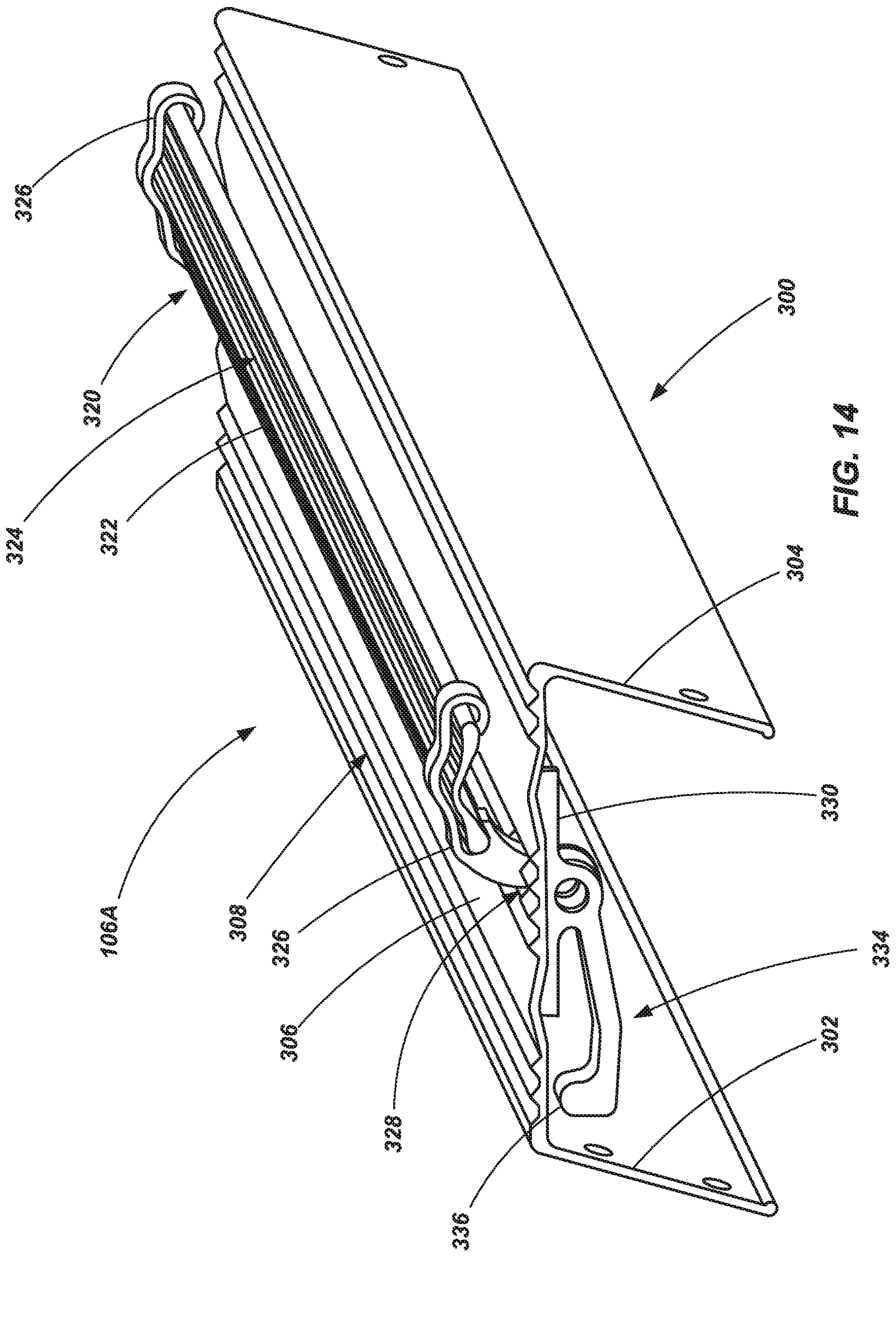
FIG. 14 is a perspective view of a rung assembly according to another embodiment of the present invention.
Figure 15:
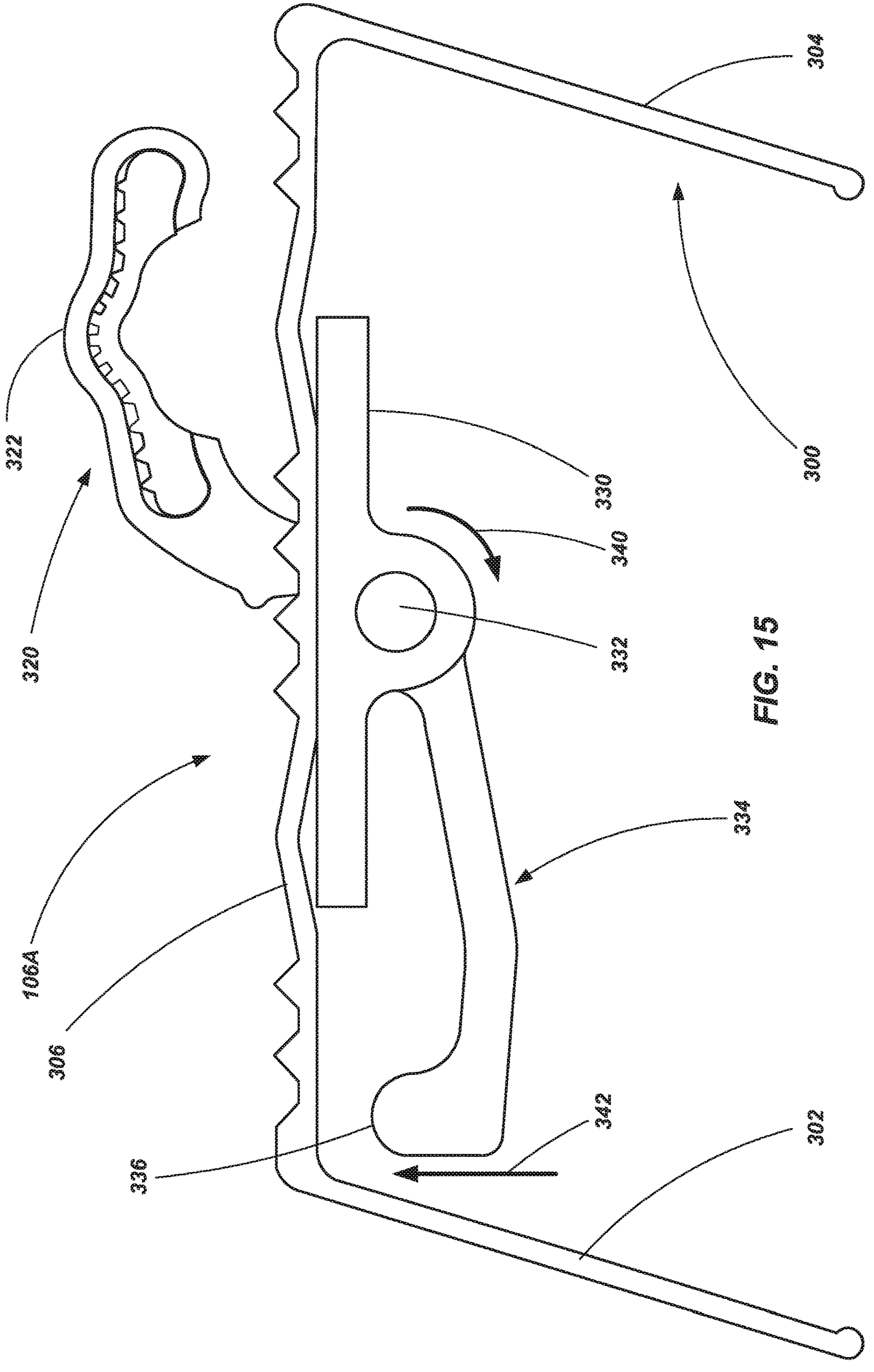
FIG. 15 is a side view of the rung assembly shown in FIG. 14.
Figure 16:
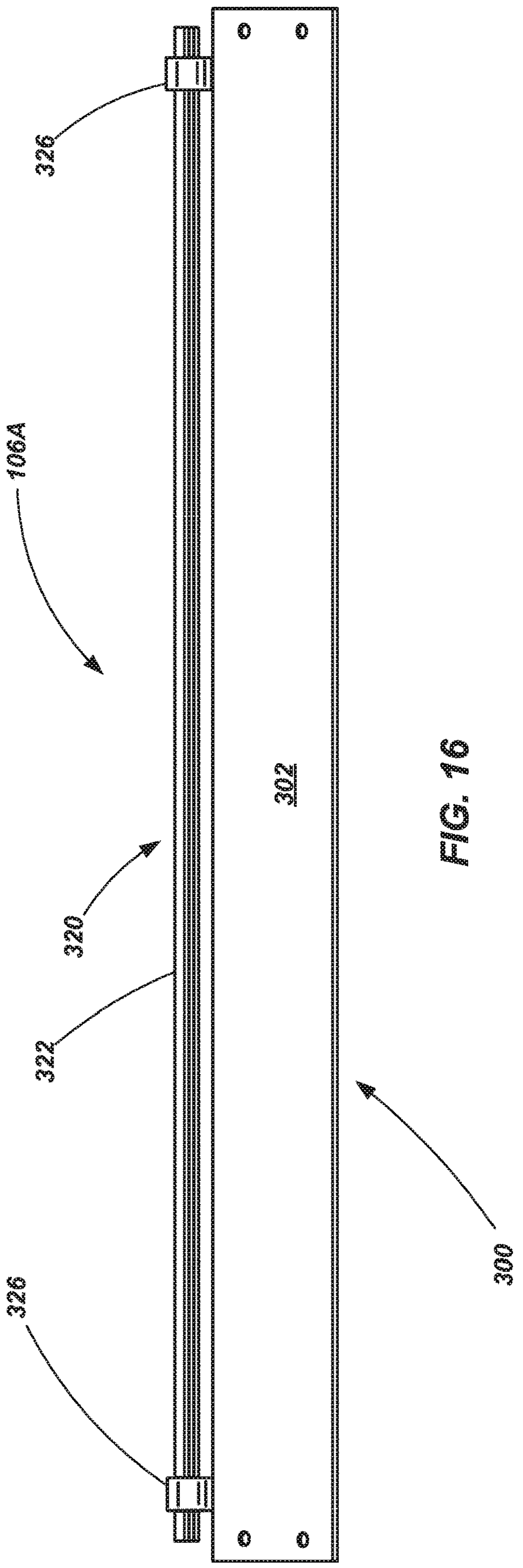
FIG. 16 is a front view of the rung assembly shown in FIG. 14.

Referring to FIGS. 14-16, a rung assembly 106A according to a further embodiment of the invention is shown. The assembly 106A includes a base member 300 that is configured for substantially rigid coupling with the rails 104 of the first assembly 102. In the embodiment shown, the base member 300 includes a front wall 302, a rear wall 304, and an upper wall 306 extending between and coupled with the front and rear walls 302 and 304. The upper wall 306 may include traction features 308 (e.g., ridges and grooves) such as are often found in conventional ladder rungs.

A displaceable member 320 includes an upper surface 322 or a tread member, which may include traction features 324, positioned above the upper wall 306 of the base member 300. The upper surface 322 is coupled to two side arms 326. The side arms 326 extend through openings 328 formed in the upper wall 306 of the base member 300 and are pivotally coupled to the base member 300 by way of a bracket 330 and pivot member 332. A lower portion 334 of the side arms 326 extends beneath the upper wall 306 of the base member 300 and includes a striking portion 336. When a user steps on the rung assembly 106A shown in FIGS. 14-16, the weight of the user causes the tread or upper surface 322 of the displaceable member 320 to be displaced downward toward the upper wall 306 of the base member 300. With the tread 322 being displaced downward, the side arms 326 pivot relative to the base member 300, as indicated by the directional arrow 340 (FIG. 15). When the side arms 326 pivot as indicated by direction arrow 340 (FIG. 15), the lower portion 334 of the side arms 326 are displaced upwards, as indicated by directional arrow 342, causing the striking portion to strike the upper wall 306 of the base member and create a knocking or ringing sound as an alert to the user that they have stepped on the rung assembly 106A. Thus, the pivotal side arms function as the alert mechanism in the embodiment shown in FIGS. 14-16. The displaceable member 320 may return to its unactuated position after a user steps off of the rung assembly due to gravity (e.g., a weight associated with the lower portions of the side arms 326) or by way of a biasing member (not shown) associated with the side arms 326 or the treat 322.

In any of the embodiments described above, when a user stands on the rung assembly 106A (which, in the embodiment shown in FIG. 1 is the lowermost rung of the ladder), they will be alerted by an audible alarm, and in some embodiments, by force feedback (e.g., such as feeling a small slap or knock of the rung from the alert mechanism),—as well as by sensing that there is a different "feel" when standing on the rung assembly as compared to other rungs of the ladder—that they are standing on the lowermost "rung" and recognize that they are only one rung or step above the ground. It is noted that the different "feel" when standing on the rung assembly, event after the alert mechanism has been actuated, may take various different forms. For example, the embodiment described with respect to FIGS. 1-5 may include the tread portion residing at a slight angle as compared to other rungs, or it may have a slight rocking feel to it as it rests on the pin members of the alert mechanisms. In another example, in an embodiment associated with that shown in FIGS. 10-13, the displaceable member may be configured to protrude slightly from the base member when in the second or actuated position giving a slight "uneven" feel across the surface of the rung. Similarly, in the embodiment shown in FIGS. 14-16, a user will send a slight unevenness in the rung as the displaceable member will rest atop the base member when in the actuated position.

It is noted that in other embodiments, the rung assembly may not be located as the lowermost rung of the ladder. For example, it may be located as the second lowermost rung of the ladder, indicating to the user that they still have one more rung to descend prior to reaching the ground.

One advantage shared by all of the embodiments described herein, is that the front edge of the rung assembly is not substantially displaced in elevation between the unactuated and actuated states. This includes the embodiment shown in FIGS. 1-5 where the front edge may pivot, but is not substantially displaced in terms of elevation. This provides a positive position of the front edge of the rungs (relative to other components of the ladder, such as the side rails), maintaining the distance between adjacent rungs at their front edges so that the user feels confident as they engage each rung and/or rung assembly. Stated another way, the side front edge of the rung assembly remains at a substantially fixed location on the ladder, even though other components of the rung assembly may be displaced or more relative to, for example, the side rails.

Of course, the specific embodiments described herein are merely examples and a variety of ladder configurations may be used in conjunction with the present invention. While specifically described with respect to use in stepladders, the rung assemblies may be used in other types of ladders, including extension ladders and combination ladders, without limitation. For example, non-limiting examples of extension ladders into which a rung assembly of the present invention may be incorporated are described in U.S. Pat. No. 8,365,865 (U.S. patent application Ser. No. 12/714,313 filed on Feb. 26, 2010) entitled ADJUSTABLE LADDERS AND RELATED METHODS, the disclosure of which is incorporated by reference herein in its entirety. Additionally, non-limiting examples of articulating ladders (sometimes referred to as combination ladders) into which a rung assembly of the present invention may be incorporated are described in U.S. Pat. No. 7,364,017 (U.S. patent application Ser. No. 10/706,308, filed on Nov. 11, 2003) entitled COMBINATION LADDERS, LADDER COMPONENTS AND METHODS OF MANUFACTURING SAME, the disclosure of which is incorporated by reference herein in its entirety.

It is further noted that, while various embodiments have been described in terms of generally mechanical assemblies, that other embodiments may also be employed such as an assembly having a sensor associated with a given rung wherein, when actuated, the sensor triggers an audible or sensory (e.g., physical vibration) alarm for a user to perceive. For example, in one embodiment, the combination of a pin/spring/detent mechanism may be replaced by a switch which is coupled with a speaker or a vibrating mechanism to effect an alarm when actuated. Of course other types of sensors and actuators may be employed as well.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A ladder comprising:

a first assembly comprising a first pair of rails including a first rail and a second rail spaced away from the first rail; and a rung assembly coupled between the first pair of rails, the rung assembly comprising:

a base member comprising an upper wall having a channel formed therein, the channel extending between the first rail and the second rail;

a displaceable member disposed within the channel and configured to be displaced from a first position to a second position relative to the base member, wherein a portion of the displaceable member protrudes above a surface of the upper wall when in the first position; and at least one alert mechanism associated with the displaceable member and configured to provide an audible alert when the displaceable member is displaced from the first position to the second position;

wherein the at least one alert mechanism includes a pin, a collar slidably disposed about the pin, and a detent mechanism configured to hold the collar at a specified position on the pin until a force of a specified magnitude is applied to the collar; and wherein, in response to the force of the specified magnitude being applied to the collar, the collar is movable relative to the base member.

2. The ladder of claim 1, further comprising a plurality of additional rungs extending between and coupled to the first pair of rails.

3. The ladder of claim 2, wherein the rung assembly is positioned to act as a lowermost rung of the ladder.

4. The ladder of claim 1, wherein the displaceable member includes an upper tread portion.

5. The ladder of claim 1, wherein the base member includes:

a front wall; and a rear wall;

wherein the upper wall extends between the front wall and the rear wall.

6. The ladder of claim 1, wherein the displaceable member travels along a linear displacement path between the first position and the second position.

7. The ladder of claim 1, wherein, when the displaceable member is in the second position, an upper tread portion of the displaceable member is substantially coplanar with the upper wall of the base member.

8. The ladder of claim 1, wherein the displaceable member includes a first flange member, the base member includes a second flange member, and wherein the first and second flange members interlock with one another to retain the displaceable member within the channel.

9. The ladder of claim 1, wherein at least a portion of the at least one alert mechanism is disposed within the channel.

10. The ladder of claim 5, wherein the base member is a unitary member.

11. The ladder of claim 1, wherein the at least one alert mechanism is positioned and configured so that the detent mechanism releases the collar when the displaceable member is in the first position.

12. The ladder of claim 11, wherein the at least one alert mechanism includes two alert mechanisms.

13. The ladder of claim 1, further comprising a second assembly comprising at least one rail and a top cap coupled to the first assembly and to the second assembly.

14. A ladder, comprising:

a first assembly comprising a first pair of rails including a first rail and a second rail spaced away from the first rail; and a rung assembly coupled between the first pair of rails, the rung assembly comprising:

a base member comprising an upper wall having a channel formed therein, the channel extending between the first rail and the second rail;

a displaceable member disposed within the channel and configured to be displaced from a first position to a second position relative to the base member, wherein a portion of the displaceable member protrudes above a surface of the upper wall when in the first position; and at least one alert mechanism associated with the displaceable member and configured to provide an audible alert when the displaceable member is displaced from the first position to the second position;

wherein the displaceable member includes a first flange member, the base member includes a second flange member, and wherein the first and second flange members interlock with one another to retain the displaceable member within the channel.

15. A ladder, comprising:

a first assembly comprising a first pair of rails including a first rail and a second rail spaced away from the first rail; and a rung assembly coupled between the first pair of rails, the rung assembly comprising:

a base member comprising an upper wall having a channel formed therein, the channel extending between the first rail and the second rail, wherein the base member includes a protruding portion positioned in the channel;

a displaceable member disposed within the channel and configured to be displaced from a first position to a second position relative to the base member and relative to the protruding portion, wherein the protruding portion extends longitudinally across the displaceable member, wherein a portion of the displaceable member protrudes above a surface of the upper wall when in the first position, wherein the displaceable member includes a hollow interior configured to receive the protruding portion when in the second position; and at least one alert mechanism associated with the displaceable member and configured to provide an audible alert when the displaceable member is displaced from the first position to the second position.

16. The ladder of claim 1, wherein the collar generates an audible alert in response to movement away from the specified position on the pin.

* * * * *